| (12) | United States Patent | (10) Patent No.: US 10,504,549 B2 |
|---|---|---|
| | Chang et al. | (45) Date of Patent: Dec. 10, 2019 |

(54) DISC LIBRARY STORAGE SYSTEM

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jung-Fang Chang, Taipei (TW); Cheng-Wen Huang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/029,816

(22) Filed: Jul. 9, 2018

(65) Prior Publication Data

US 2019/0139572 A1 May 9, 2019

Related U.S. Application Data

(60) Provisional application No. 62/581,769, filed on Nov. 5, 2017.

(30) Foreign Application Priority Data

Mar. 28, 2018 (CN) .......................... 2018 1 0264583

(51) Int. Cl.
  *G11B 17/26* (2006.01)
  *G11B 17/22* (2006.01)
(52) U.S. Cl.
  CPC .............. *G11B 17/26* (2013.01); *G11B 17/22* (2013.01)

(58) Field of Classification Search
  None
  See application file for complete search history.

(56) References Cited

U.S. PATENT DOCUMENTS

| 4,730,292 A | * | 3/1988 | Hasegawa | ............ | G11B 17/225 |
|---|---|---|---|---|---|
| | | | | | 369/30.83 |
| 5,101,387 A | * | 3/1992 | Wanger | .................. | G11B 17/22 |
| | | | | | 360/92.1 |
| 5,319,621 A | * | 6/1994 | Amar | ..................... | G11B 17/30 |
| | | | | | 360/98.06 |

(Continued)

FOREIGN PATENT DOCUMENTS

WO  WO-2016033943 A1 * 3/2016 ........... G11B 17/226

OTHER PUBLICATIONS

Luo, CN 104217735A, "Opening-closing device of rotating cage type compact disk juke-box disk support," published Dec. 17, 2014. (Year: 2014).*

(Continued)

*Primary Examiner* — William J Klimowicz
(74) *Attorney, Agent, or Firm* — McClure, Qualey & Rodack, LLP

(57) ABSTRACT

The invention discloses a disc library storage system including a disc library, a disc drive tower and a disc transport device. The disc library is for placing multiple discs. The disc drive tower includes multiple disc drives for reading/writing data. The disc transport device is used for moving the discs to the disc drive tower from the disc library and moving the discs to the disc library from the disc drive tower.

17 Claims, 14 Drawing Sheets

(56) References Cited

U.S. PATENT DOCUMENTS

| | | | | |
|---|---|---|---|---|
| 5,813,740 A * | 9/1998 | Chang | ............... | G11B 33/0477 |
| | | | | 312/223.2 |
| 6,072,766 A * | 6/2000 | Konshak | ............. | G11B 15/688 |
| | | | | 369/30.5 |
| 6,075,758 A * | 6/2000 | Wu | ...................... | G11B 17/226 |
| | | | | 369/30.52 |
| 7,151,718 B2 * | 12/2006 | Schumacher | .......... | G11B 17/26 |
| | | | | 369/30.33 |
| 7,854,332 B1 * | 12/2010 | Clausen | ................ | G11B 17/22 |
| | | | | 211/41.12 |
| 10,170,149 B2 * | 1/2019 | Hsu | ........................ | G11B 17/22 |
| 10,210,897 B1 * | 2/2019 | Chang | ............... | G11B 17/0284 |
| 10,262,687 B1 * | 4/2019 | Chang | .................. | F16H 37/065 |
| 2003/0123220 A1 * | 7/2003 | Huang | ................ | G11B 33/122 |
| | | | | 361/679.33 |
| 2005/0248916 A1 * | 11/2005 | Huang | ................ | G11B 33/122 |
| | | | | 361/679.33 |
| 2017/0287519 A1 * | 10/2017 | Luo | ...................... | G11B 17/226 |
| 2018/0261246 A1 * | 9/2018 | Hsu | ....................... | G11B 17/22 |

OTHER PUBLICATIONS

CN 205984275 U (Zhang), published Feb. 22, 2017. (Year: 2017).*
CN 180511005 A, published Sep. 7, 2018. (Year: 2018).*

* cited by examiner

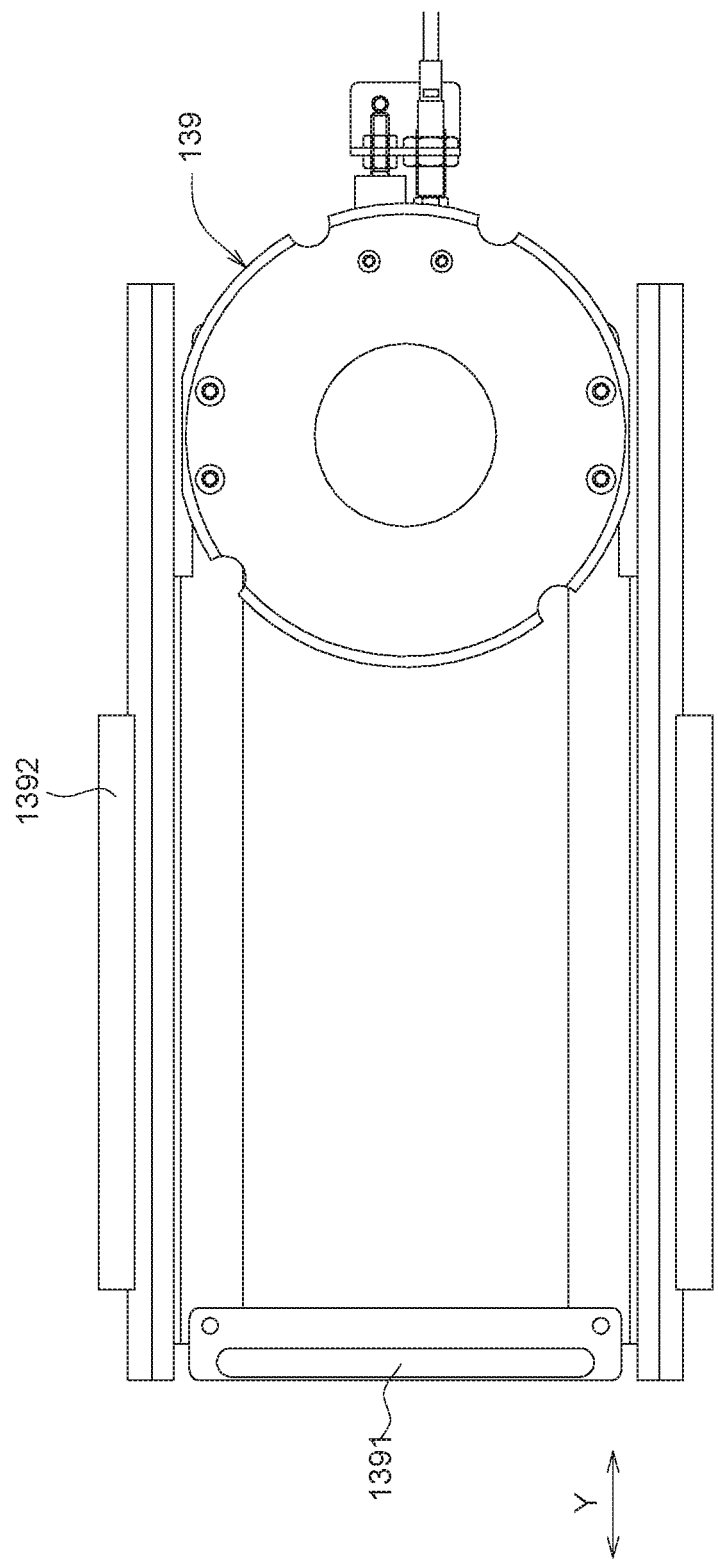

DISC LIBRARY STORAGE SYSTEM

This application claims the benefits of U.S. provisional application Ser. No. 62/581,769, filed Nov. 5, 2017 and People's Republic of China application Serial No. 201810264583.7, filed Mar. 28, 2018, the subject matters of which are incorporated herein by reference.

BACKGROUND OF THE INVENTION

Field of the Invention

The invention relates in general to a database storage system, and more particularly to a disc library storage system using discs as a storage medium for storing a large volume of data.

Description of the Related Art

The disc drive is installed in a personal computer to read data from the disc or write data to the disc, and is normally used for storing a small volume of data. However, along with the development of big data, the database storage system is provided to store a large volume of data. Therefore, it has become a prominent task to the industries to use discs as a storage medium and combine discs and disc drives to form a disc library storage system capable of storing a large volume of data to increase the storage capacity of the database storage system.

SUMMARY OF THE INVENTION

The invention is related to a disc library storage system using discs as a storage medium for storing a large volume of data to increase the capacity of data storage.

According to one embodiment of the present invention, a disc library storage system including a disc library, a disc drive tower and a disc transport device is provided. The disc library is used for placing multiple discs. The disc drive tower includes multiple disc drives for reading data from the discs or writing data into the discs. The disc transport device is used for moving the discs to the disc drive tower from the disc library and moving the discs to the disc library from the disc drive tower.

In an embodiment, the disc library includes an upper cover, a lower cover and multiple storage cartridge assemblies detachably disposed between the upper cover and the lower cover.

In an embodiment, each storage cartridge assembly includes a fixing column and multiple disc storage cartridges rotatably disposed on the fixing column; the two ends of the fixing column are detachably disposed on the upper cover and the lower cover respectively through a fixing piece.

In an embodiment, the disc library includes multiple storage cartridge assemblies each including a fixing column and multiple disc storage cartridges each having a pipe sleeve and a disc placing tray; the disc storage cartridges are mounted on the fixing column through the pipe sleeve and match with the fixing column through interference fit to apply an elastic force to the fixing column.

In an embodiment, the pipe sleeve has an opening and at least one interference arm located besides the opening and matching with the fixing column through interference fit.

In an embodiment, the disc library includes multiple disc storage cartridges; the disc transport device includes a disc grabbing device and a lifting mechanism for driving the disc grabbing device to vertically move to the vertical position of a corresponding disc storage cartridge; the disc grabbing device includes a push lever, when the disc library rotates along a first direction, the push lever pushed the corresponding disc storage cartridge out the disc library.

In an embodiment, the tip of the push lever has a roller; each disc storage cartridge has an outer flange; when the disc library rotates along the first direction and the push lever pushes the corresponding disc storage cartridge out the disc library, the push lever contacts the outer flange through the roller.

In an embodiment, the disc library includes multiple disc storage cartridges; the disc transport device includes an optical positioning device for positioning a position at which the disc storage cartridge is pushed out from the disc library; the optical positioning device emits a light spot for detecting the position of an edge contour of the disc storage cartridge to determine whether the disc storage cartridge has reached a positioning point.

In an embodiment, the disc transport device further includes at least one position adjusting mechanism for adjusting the position of the disc transport device to adjust the position correspondence between the disc transport device, the disc library and the disc drive tower.

In an embodiment, the disc drive tower further includes at least one position adjusting mechanism for adjusting the position of the disc drive tower to adjust the position correspondence between the disc drive tower, the disc library and the disc transport device.

In an embodiment, the disc library storage system further includes a tray support frame disposed opposite to the disc drive tower; the tray support frame comprises multiple support recesses respectively disposed corresponding to the positions of trays of the disc drives; when the tray of the disc drive is ejected from the disc drive, the front end of the tray leans on the corresponding support recess.

In an embodiment, the disc drive tower includes a disc supplement cartridge slidably disposed on the bottom of the disc drive tower.

In an embodiment, the disc drive tower includes a casing; each disc drive is positioned on the casing through a first positioning slot, a second positioning slot, a first positioning rod and a second positioning rod; the first positioning slot and the second positioning slot are disposed at different horizontal planes on one side of the casing; the length of the first positioning slot is different from that of the second positioning slot; the first positioning rod and the second positioning rod are disposed at different horizontal planes and different vertical planes on one side of the disc drive; the first positioning rod and the second positioning rod are correspondingly disposed in the first positioning slot and the second positioning slot, respectively.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 5 is a top view of a disc supplement cartridge at the bottom of a disc drive tower.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
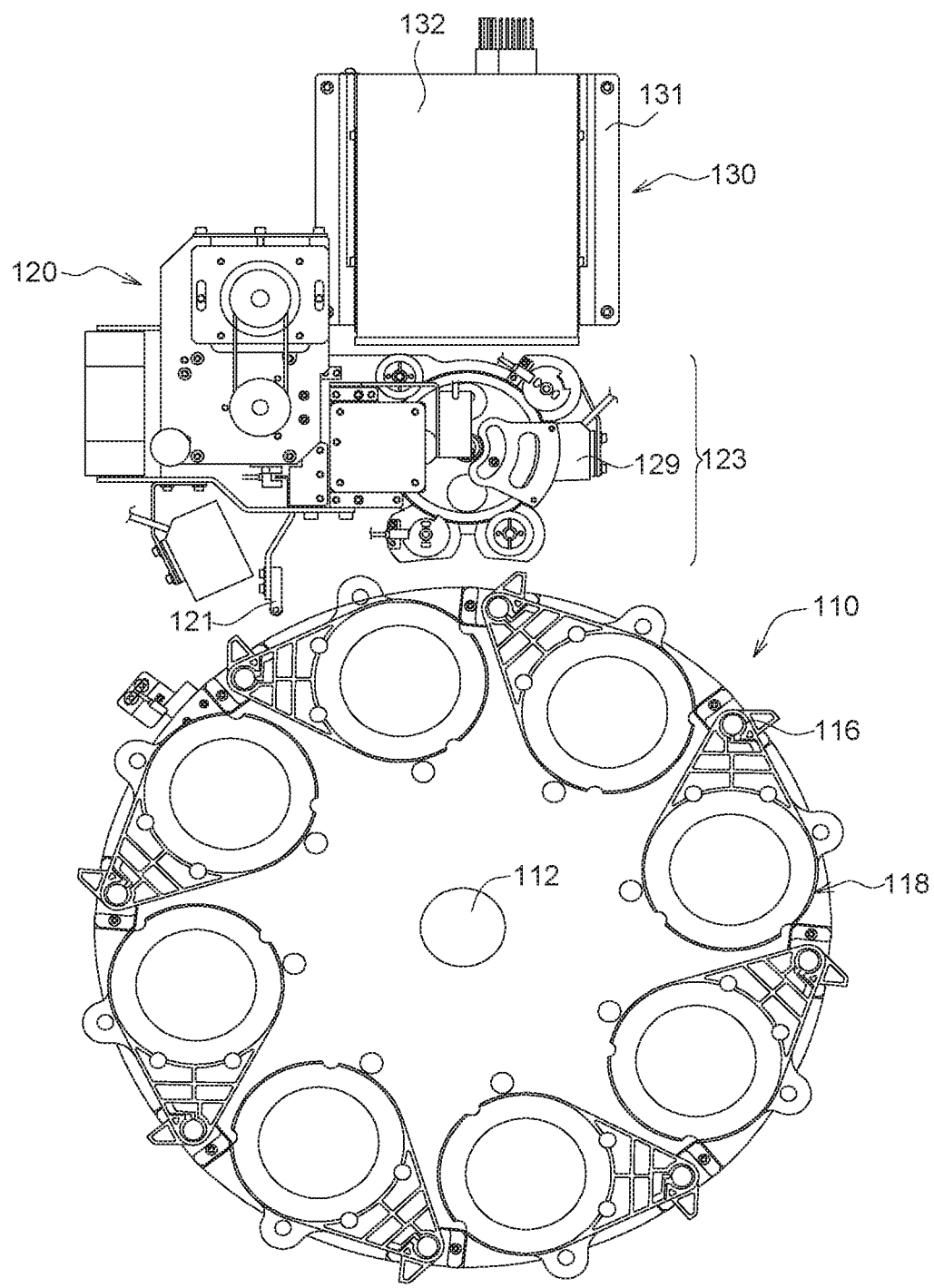
FIG. 1A is a top view of a disc library storage system according to an embodiment of the invention.
Figure 1B:
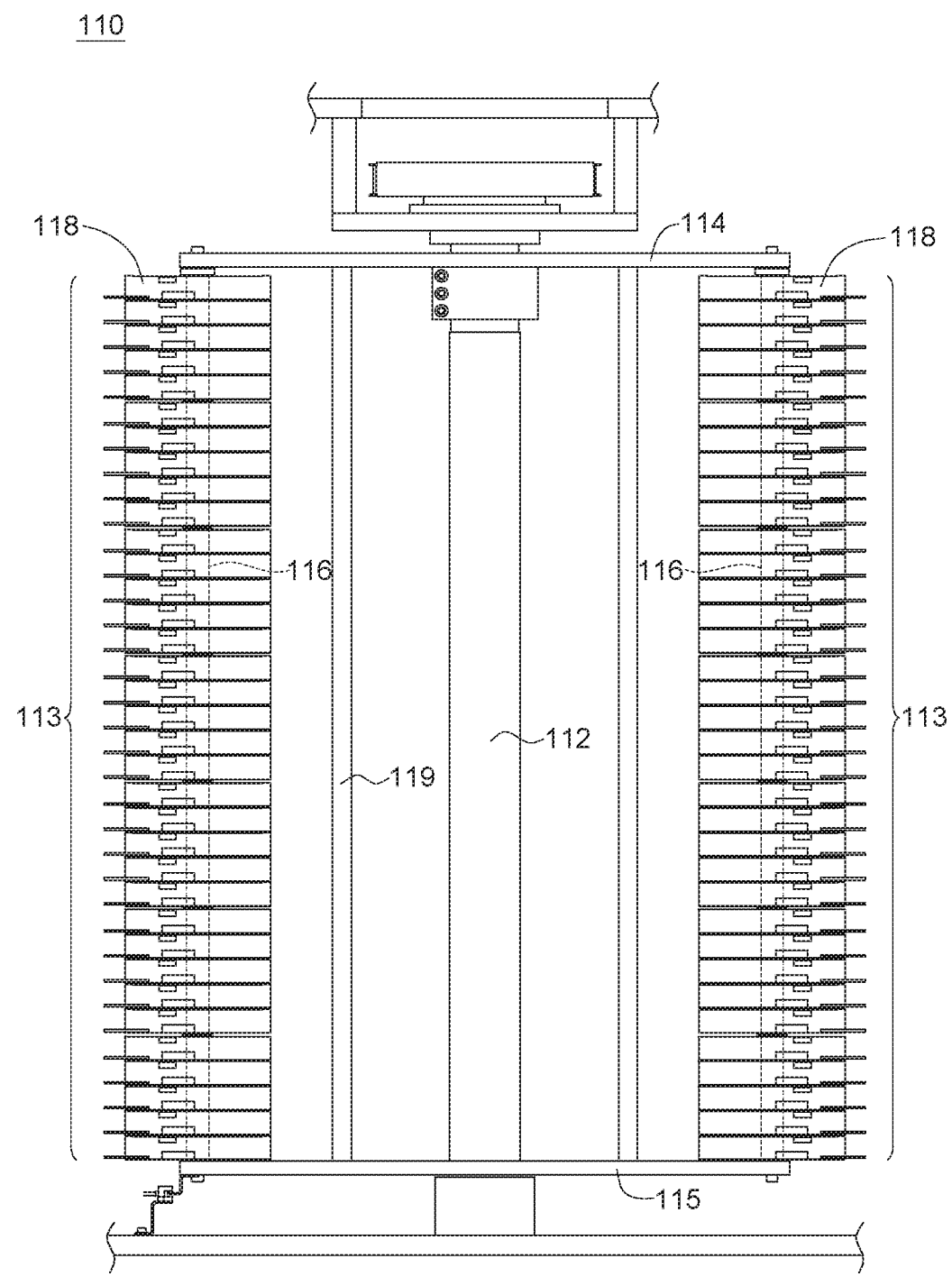
FIG. 1B is a side view of a disc library of a disc library storage system according to an embodiment of the invention.
Figure 1C:
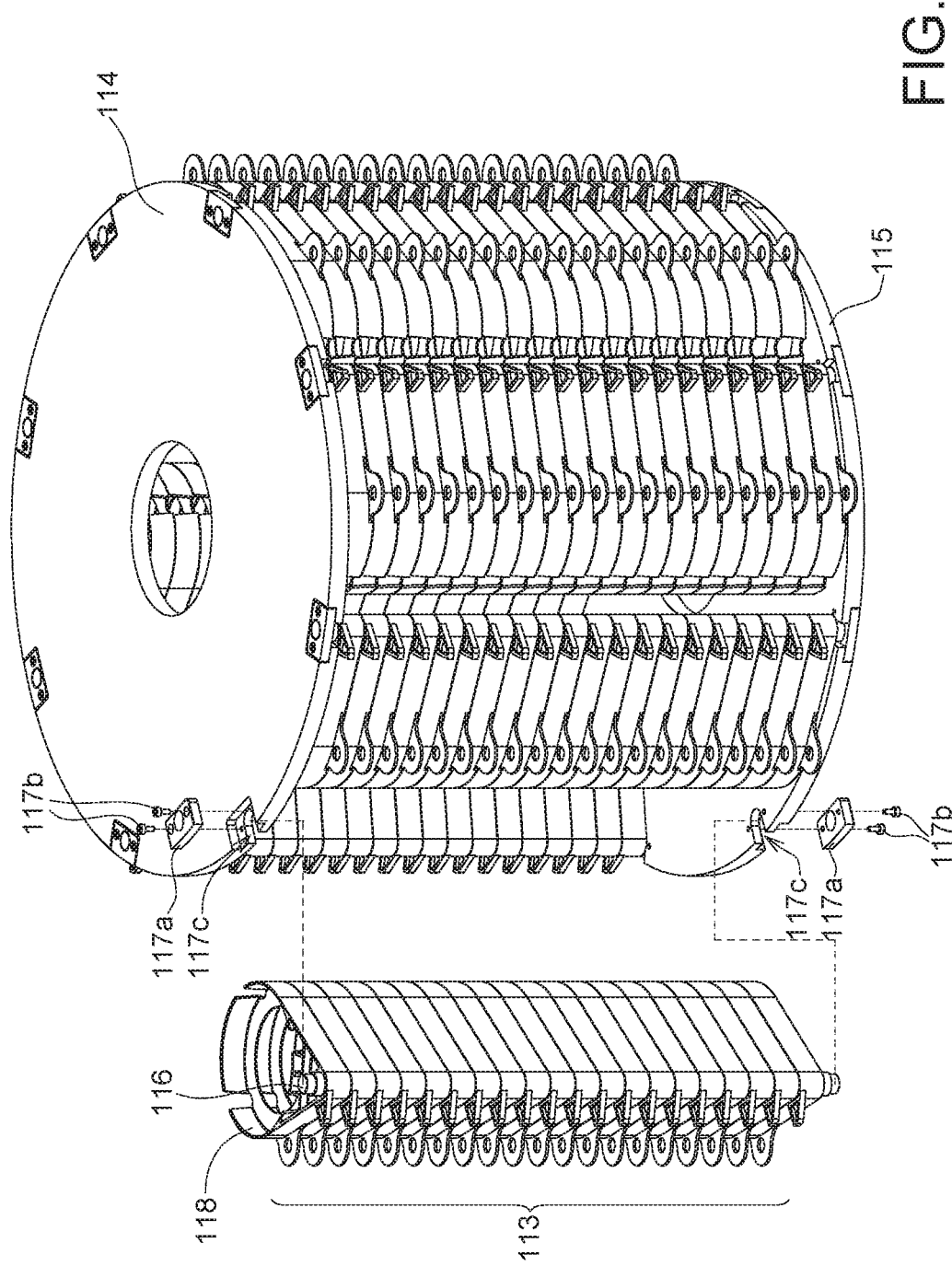
FIG. 1C is an explosion diagram of a disc library of a disc library storage system according to an embodiment of the invention.
Figure 1D:
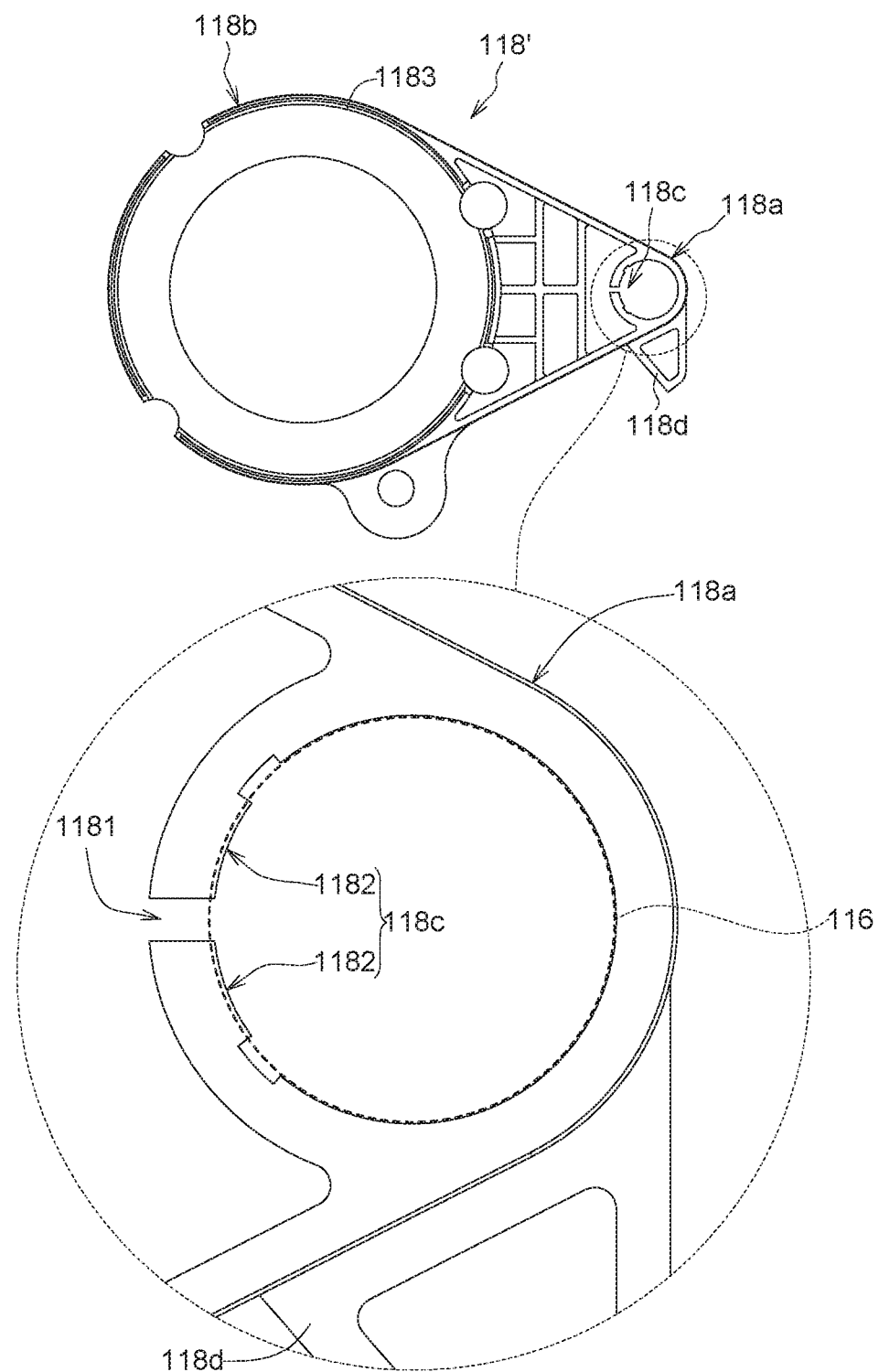
FIG. 1D is a schematic diagram and a partial enlarged view of a disc storage cartridge.

FIG. 1A is a top view of a disc library storage system 100 according to an embodiment of the invention. FIG. 1B is a side view of a disc library 110 of a disc library storage system 100 according to an embodiment of the invention. FIG. 1C is an explosion diagram of a disc library 110 of a disc library storage system 100 according to an embodiment of the invention. FIG. 1D is a schematic diagram and a partial enlarged view of a disc storage cartridge 118.

Refer to FIG. 1A. The disc library storage system 100 includes a disc library 110, a disc transport device 120 and a disc drive tower 130. The disc library 110 is used for placing multiple discs. The disc drive tower 130 includes multiple disc drives for reading data from the discs and/or writing data into the discs. The disc transport device 120 is used for moving the discs to the disc drive tower 130 from the disc library 110 or moving the disc to the disc library 110 from the disc drive tower 130.

Refer to FIG. 1B. The disc library 110 includes an upper cover 114, a lower cover 115 and multiple storage cartridge assemblies 113. The storage cartridge assemblies 113 are disposed between the upper cover 114 and the lower cover 115, and each storage cartridge assembly includes multiple disc storage cartridges 118 used for placing multiple discs. The center of the disc library 110 has a shaft 112. The disc library 110 can be driven by a driver (not illustrated) to rotate around the shaft 112. The driver can be realized by a motor, which can drive the disc library 110 to rotate directly or through the use of a pulley, a gear set or other transmission members.

In the embodiments of the invention, the disc library 110 can be driven to rotate. Through the rotation of the disc library 110, one of the storage cartridge assemblies 113 is selected and moved to a position corresponding to the disc transport device 120, and one of the disc storage cartridges 118 of the selected storage cartridge assembly 113 can be rotated out and return to the disc library 110.

As indicated in FIG. 1A, the disc library 110 has 8 storage cartridge assemblies 113, but the invention is not limited thereto. In the embodiments of the invention, each storage cartridge assembly 113 is detachably disposed between the upper cover 114 and the lower cover 115. Refer to FIG. 1B and FIG. 1C. Each storage cartridge assembly 113 includes a fixing column 116 and multiple disc storage cartridges 118 rotatably disposed on the fixing column 116. The upper cover 114 and the lower cover 115 are fixed on the shaft 112 and disposed oppositely. The two ends of the fixing column 116 are detachably disposed on the upper cover 114 and the lower cover 115 respectively. In an embodiment, the two ends of the fixing column 116 are detachably disposed on the upper cover 114 and the lower cover 115 respectively through the fixing pieces 117a.

Refer to FIG. 1C. The upper cover 114 and the lower cover 115 respectively have a fixing slot 117c for receiving the two ends of the fixing column 116. During assembly, the two ends of the fixing column 116 can be placed into the two fixing slots 117c. Then, the two fixing pieces 117a can pass through the two ends of the fixing column 116 to be screwed on the upper cover 114 and the lower cover 115 by the screws 117b to fix the storage cartridge assemblies 113 between the upper cover 114 and the lower cover 115. The screws 117b are detachable. When a certain disc storage cartridge 118 of a storage cartridge assembly 113 is broken and needs to be replaced, the storage cartridge assembly 113 can be taken from the disc library 110 by detaching the two fixing pieces 117a from the fixing column 116. Thus, the broken disc storage cartridge 118 can be quickly replaced, and there is no need to detach the upper cover 114, the lower cover 115 or other storage cartridge assemblies 113.

Refer to FIG. 1C and FIG. 1D. The disc storage cartridges 118 of each storage cartridge assembly 113 are serially mounted on the fixing column 116, and each of the disc storage cartridges 118 can place multiple discs, such as 12 discs. In an embodiment, the disc storage cartridges 118 include a main body 118'. The main body 118' has a pipe sleeve 118a and a disc placing tray 118b, and is mounted on a corresponding fixing column 116 through the pipe sleeve 118a and can be rotated around the fixing column 116.

Refer to the enlarged view of FIG. 1D. FIG. 1D illustrates the state of the disc storage cartridge 118 before being mounted on the fixing column 116. For the convenience of explanation, the position of the fixing column 116 is illustrated by dotted lines.

The pipe sleeve 118a of the main body 118' has an opening 1181 and a pre-press structure 118c located besides the opening 1181. The pre-press structure 118c matches with the fixing column 116 through interference fit and applies an elastic force to the fixing column 116. In an embodiment, the pre-press structure 118c includes two interference arms 1182, respectively located on the two sides of the opening 1181. The two interference arms 1182 match with the fixing column 116 through interference fit. As indicated in FIG. 1D, before the disc storage cartridges 118 are mounted on the fixing column 116, the inner side of the interference arms 1182, that is, the side close to the fixing column 116, partly overlaps the fixing column 116.

Since the interference arms 1182 match with the fixing column 116 through interference fit, when the disc storage cartridges 118 are mounted on the fixing column 116, the two interference arms 1182 will be pushed outwards by the fixing column 116 to press against and apply an elastic force to the corresponding fixing column 116. Thus, the elastic force generated through the interference between the interference arms 1182 and the fixing column 116 enables the disc storage cartridges 118 to be tightly mounted on the fixing column 116. Meanwhile, the disc storage cartridges 118 still can be pushed to rotate around the fixing column 116. Relevant operations of the disc storage cartridges 118 are disclosed in subsequent descriptions.

Figure 3A:
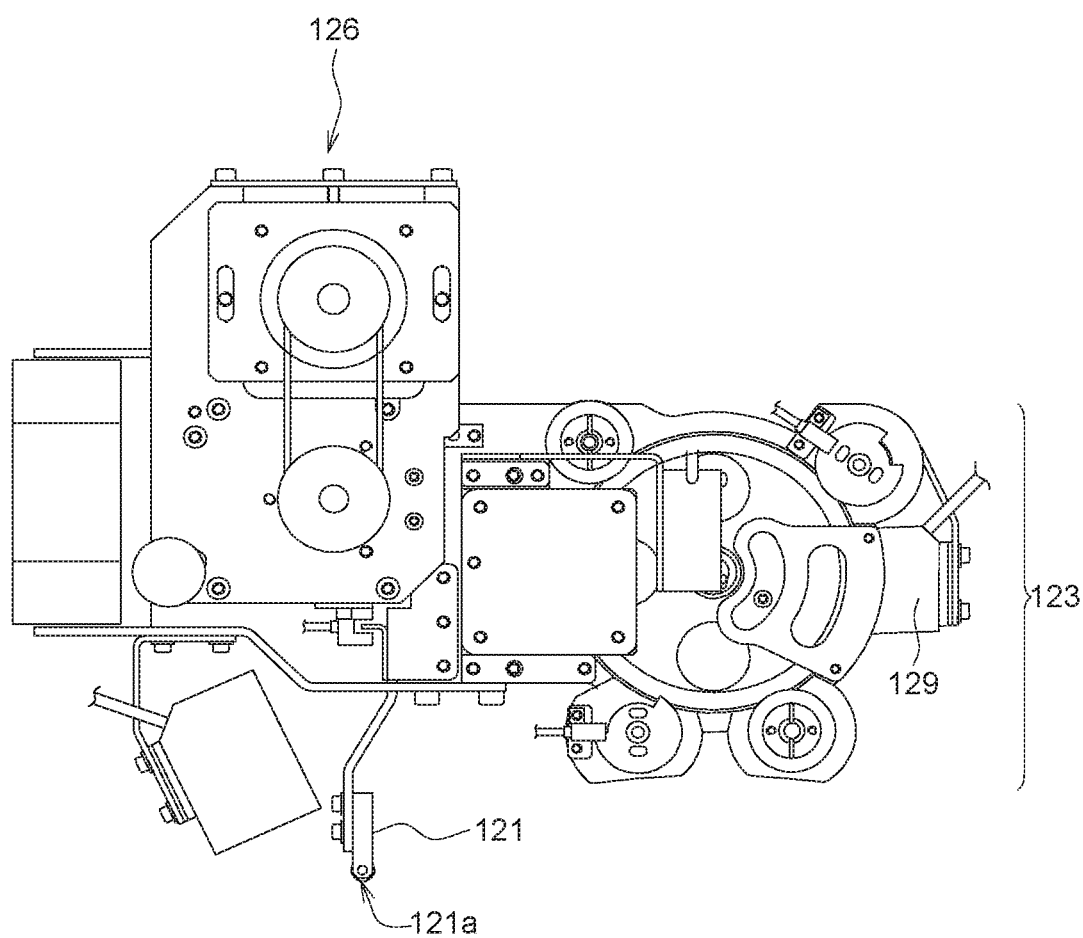
FIGS. 3A-3C respectively are a top view, a back view and a side view of a disc transport device according to an embodiment of the invention.
Figure 3B:
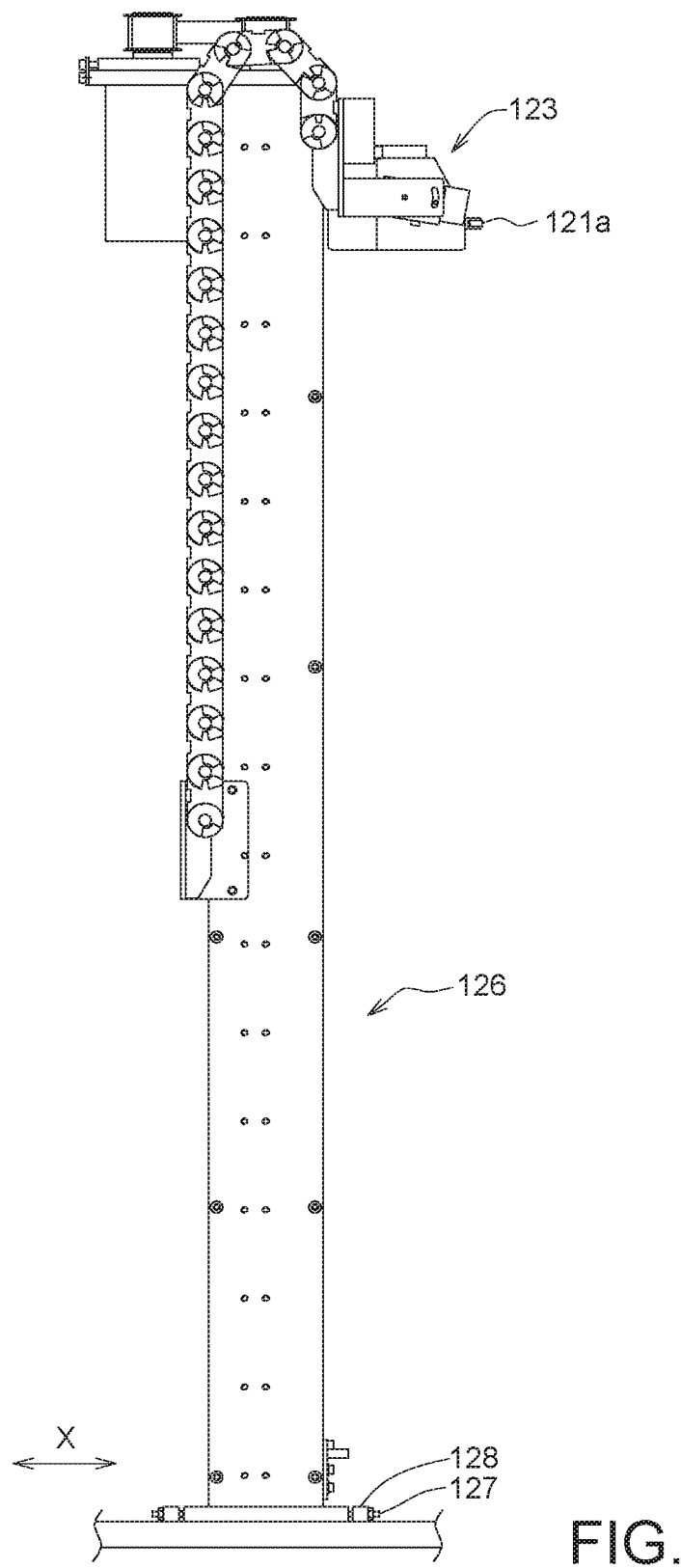
Figure 3C:
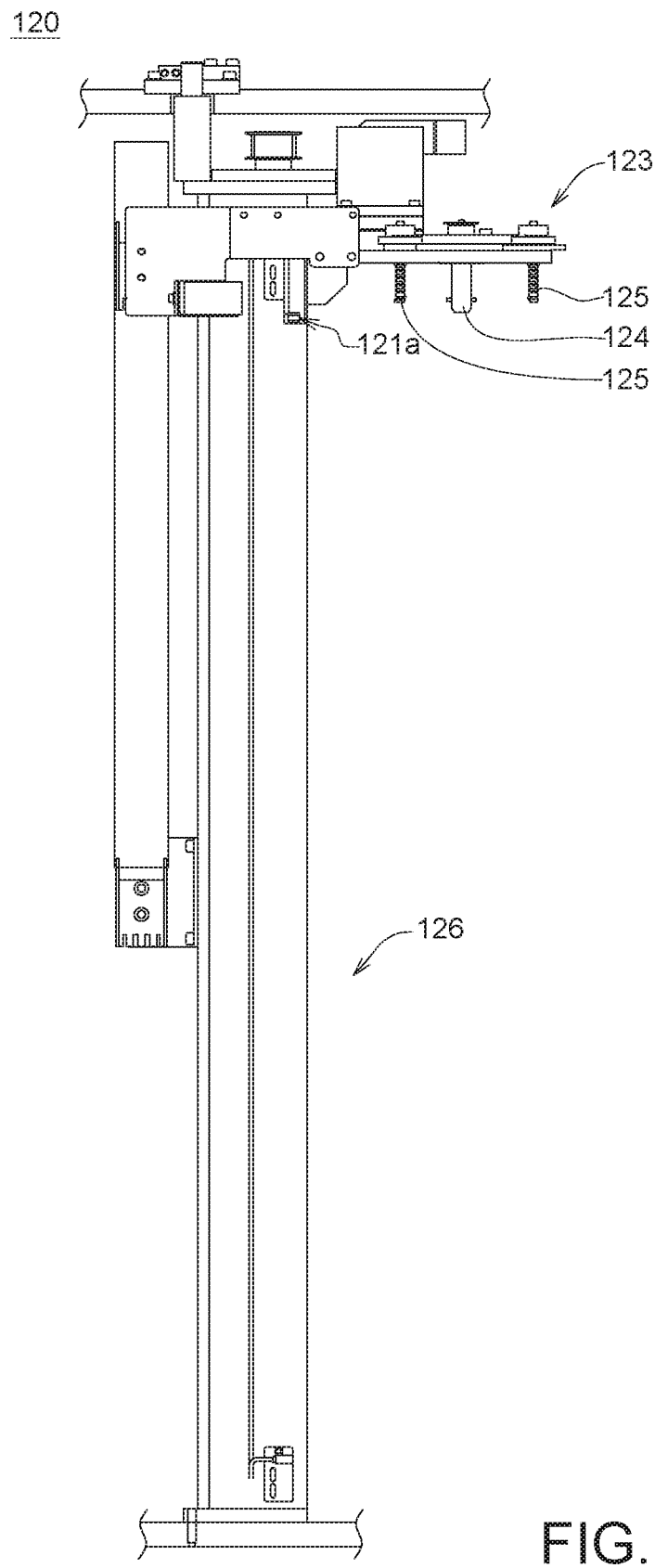

FIGS. 3A-3C respectively are a top view, a back view and a side view of a disc transport device 120 according to an embodiment of the invention.

Refer to FIGS. 3A-3C. The disc transport device 120 includes a disc grabbing device 123 and a lifting mechanism 126. The disc grabbing device 123 is disposed on the lifting mechanism 126 and used for picking up and unloading discs. In an embodiment, the disc grabbing device 123 includes a center column 124 and multiple levers 125. The center column 124 can be inserted into the center hole of the discs. The levers 125 can elastically lean on an edge of the discs. In the present embodiment, discs can be picked up and unloaded by a disc distributing mechanism disposed on the center column 124 or on the levers 125 at an edge of the discs, and the invention does not have specific restrictions in this regard.

Besides, the lifting mechanism 126 can drive the disc grabbing device 123 to move vertically to the vertical position of a corresponding disc storage cartridge 118 or the vertical position of a corresponding disc drive 132. Specifically, the disc grabbing device 123 can be moved to the vertical position of the corresponding disc storage cartridge 118 to pick up discs from the corresponding disc storage cartridge 118 or unload discs to the corresponding disc storage cartridge 118. Similarly, the disc grabbing device 123 can be moved to the vertical position of the corresponding disc drive 132 to pick discs from the tray 133 ejected from the corresponding disc drive 132 or unload discs to the tray 133 ejected from the corresponding disc drive 132.

Refer to FIG. 3A. The disc grabbing device 123 further includes a push lever 121 whose tip has a roller 121a. The push lever 121 is used for pushing the disc storage cartridge 118 to rotate out the disc library 110. The push lever 121, along with the disc grabbing device 123, can be moved vertically to a position corresponding to any disc storage cartridge 118. Moreover, the main body 118' of the disc storage cartridge 118 has an outer flange 118d disposed on one side of the pipe sleeve 118a (as indicated in FIG. 1D).

Figure 2A:
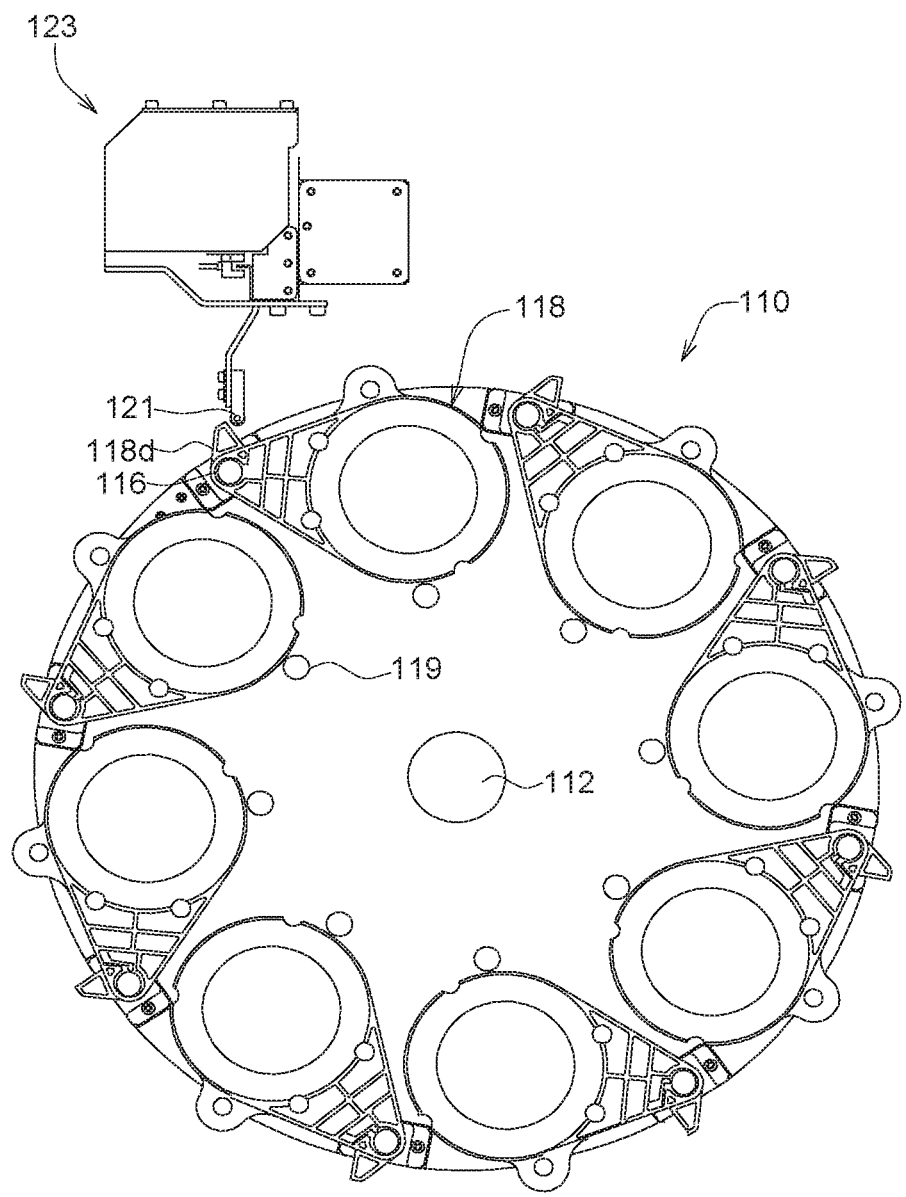
FIGS. 2A-2B are schematic diagrams of a disc storage cartridge being rotated out the disc library by a push lever according to an embodiment of the invention.
Figure 2B:
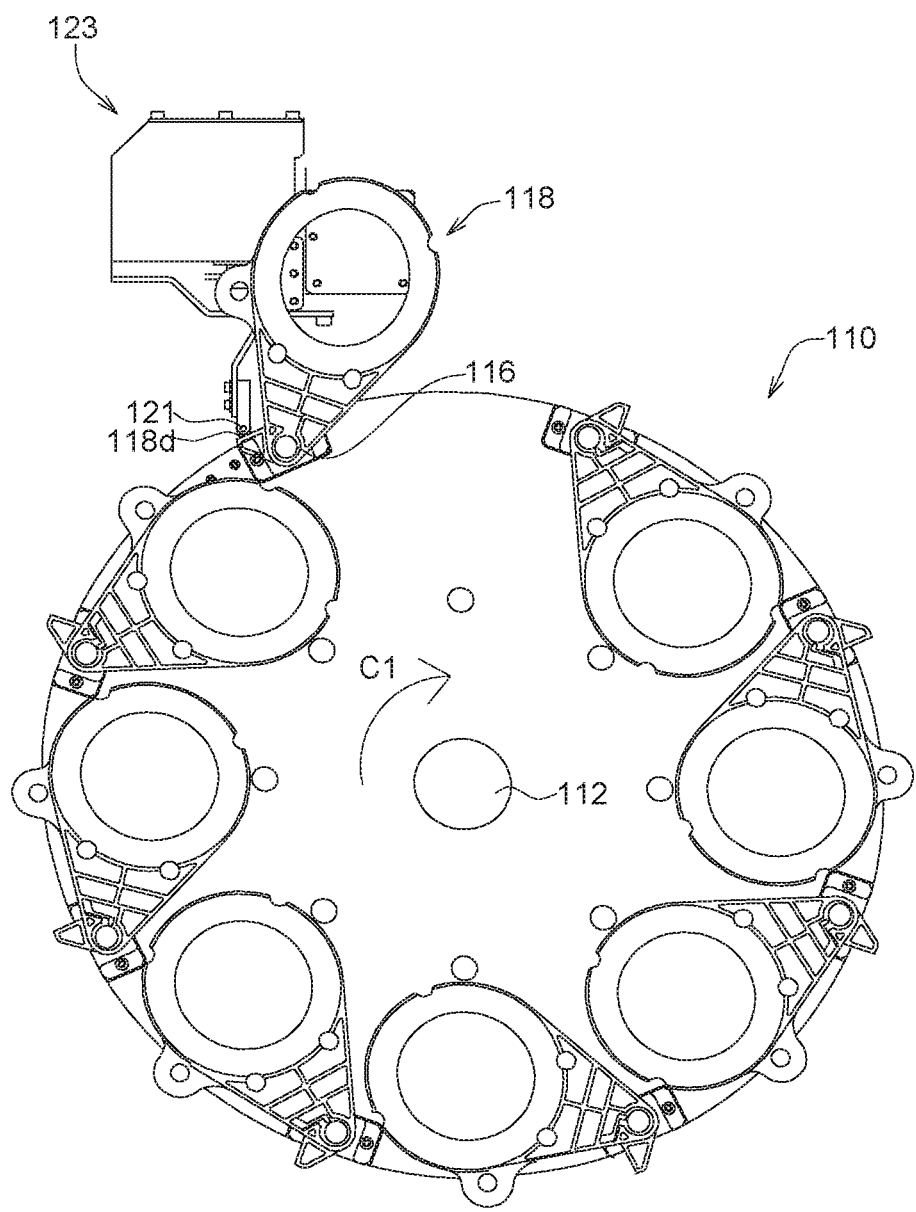
Figure 2C:
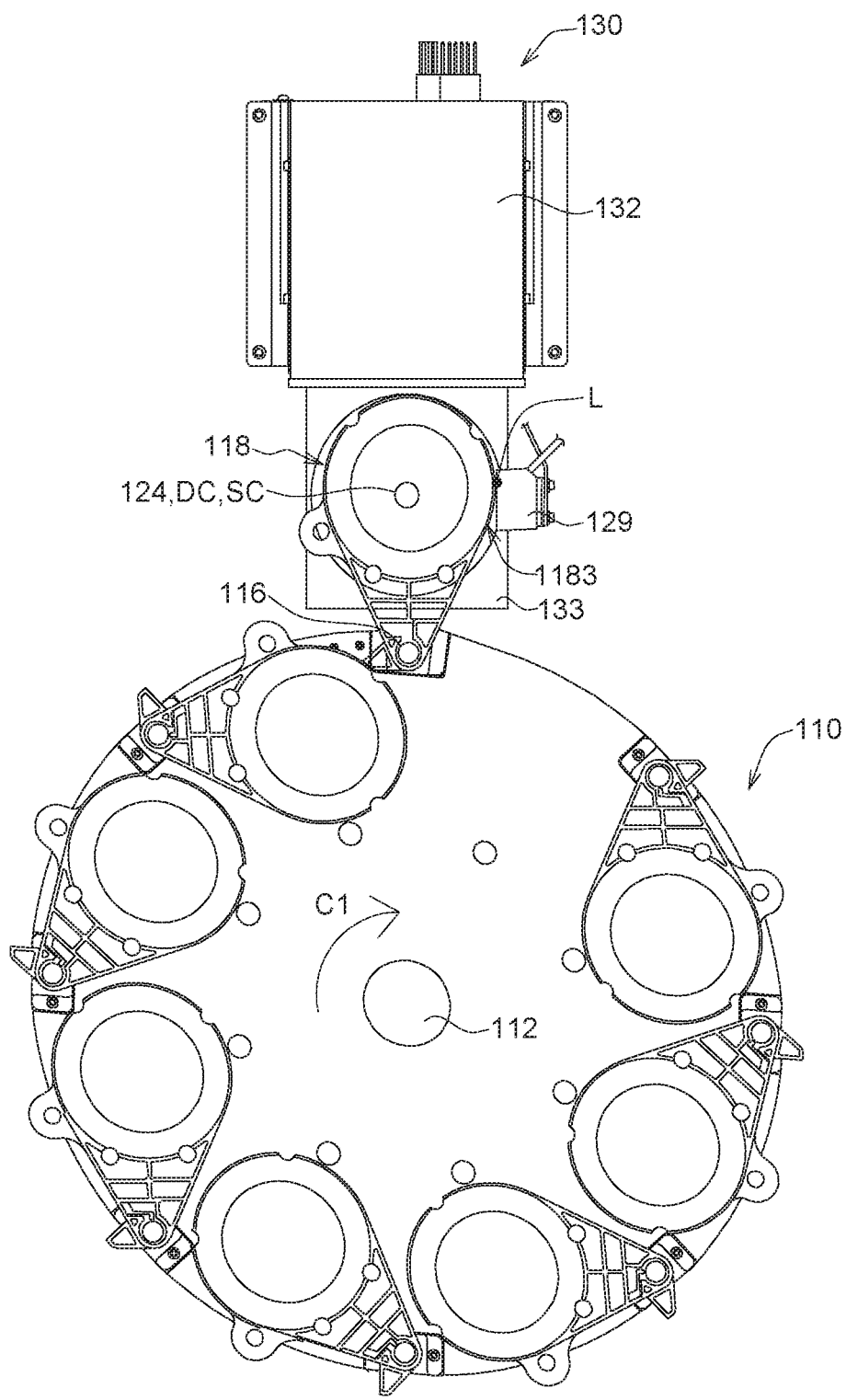
FIG. 2C is a diagram of relative positions between a disc storage cartridge located at a positioning point out of a disc library and a tray ejected out of a disc drive according to an embodiment of the invention.

Refer to FIGS. 2A-2C. FIGS. 2A-2B are schematic diagrams of a disc storage cartridge 118 being rotated out the disc library 110 by a push lever 121 according to an embodiment of the invention. FIG. 2C is a diagram of relative position between a disc storage cartridge 118 located at a positioning point out of a disc library and a tray 133 ejected out of a disc drive 132 according to an embodiment of the invention. To illustrate the position correspondence between the disc storage cartridges 118 and the push lever 121 more clearly, only a part of the disc grabbing device 123 is illustrated in FIG. 2A and FIG. 2B.

When one of the disc storage cartridges 118 is selected to be rotated out the disc library 110, the push lever 121, along with the disc grabbing device 123, is moved to a position corresponding to the selected disc storage cartridge 118 in a vertical direction as indicated in FIG. 2A. Then, as indicated in FIG. 2B, the driver drives the disc library 110 to rotate along the first rotation direction C1, such that the push lever 121 can contact the outer flange 118d of the selected disc storage cartridge 118 and generate a torque to make the disc storage cartridge 118 rotate around the fixing column 116 in a direction reverse to the first rotation direction C1. Accordingly, the disc storage cartridge 118 is rotated out the disc library 110. Furthermore, the push lever 121 contacts the outer flange 118d of the disc storage cartridge 118 through the roller 121a. During the process of rotating the disc storage cartridge 118 out the disc library 110, the roller 121a leans on the outer flange 118d and contacts the outer flange 118d by way of rolling to avoid the surface of the main body 118' being damaged by friction. As indicated in FIG. 2C, when the disc storage cartridge 118 is rotated out the disc library and reaches the positioning point, the driver stops driving the disc storage cartridges 118 to rotate. Then, the disc grabbing device 123 can pick up discs from or unload discs to the disc storage cartridge 118 that has been rotated out the disc library.

When the disc storage cartridge 118 is to be returned to the disc library 110, the driver can drive the disc library 110 to rotate in a reverse direction, such that the disc storage cartridge 118 can be rotated in a reverse direction into the disc library 110 by the push lever 121 and can be stopped and limited by a bar 119 in the disc library 110.

Refer to FIG. 3A. The disc grabbing device 123 further includes an optical positioning device 129 used for positioning the rotated-out position of the disc storage cartridge 118. The optical positioning device 129 can generate a light spot L. The light spot L can be formed of laser beams or other collimated beams. The optical positioning device 129 can be realized by a laser locator used for positioning the position and measuring the distance. According to an embodiment, during the process of rotating the disc storage cartridge 118 out the disc library 110, the optical positioning device 129 can generate a light spot L for detecting the position of an edge contour 1183 of the main body 118' to determine whether the disc storage cartridge 118 has reached the positioning point.

Let the laser beam be taken for example. during the process of rotating the disc storage cartridge 118 out the disc library 110, the optical positioning device 129 continuously emits a laser beam to generate a light spot L and determines whether a reflective laser beam is received from the projection of the light spot L on an edge contour 1183 of the main body 118'. If the optical positioning device 129 receives a reflective laser beam from the projection of the light spot L on the edge contour 1183 of the main body 118', then it is determined that the disc storage cartridge 118 has been moved to the positioning point; meanwhile, the driver can stop driving the disc library 110 to rotate, therefore, to stop the disc storage cartridge 118. As indicated in FIG. 2C, when the selected disc storage cartridge 118 is rotated out the disc library and located at the positioning point, the light spot L emitted from the optical positioning device 129 will be projected on the edge contour 1183 of the disc storage cartridges 118. Conversely, if the optical positioning device 129 does not receive a reflective laser beam from the projection of the light spot L on the edge contour 1183 of the main body 118', then it is determined that the disc storage cartridge 118 has not been moved to the positioning point; meanwhile, the driver can continuously drive the disc library 110 to rotate to correct the position of the disc storage cartridge 118 until the optical positioning device 129 receives a reflective laser beam from the projection of the light spot L on the edge contour 1183.

In the embodiments of the invention, since the lifting mechanism 126 only drives the disc grabbing device 123 to move vertically, the position of the disc on the horizontal plane needs to correspond to the position of the disc grabbing device 123 on the horizontal plane. For example, the center hole of the disc needs to be aligned with the center column 124 of the disc grabbing device, such that during the process of driving the disc grabbing device 123 to move vertically, the center column 124 can be inserted into the center hole of the discs. In other words, when the position of the disc on the horizontal plane corresponds to that of the disc grabbing device 123 on the horizontal plane, the disc grabbing device 123 only needs to move vertically and does not need to move in a horizontal manner. Thus, the design of the lifting mechanism 126 can be greatly simplified.

The disc grabbing device 123 respectively picks up and unloads discs between the disc storage cartridge 118 and the tray 133 ejected from the disc drive 132. As indicated in FIG. 2C, when the disc storage cartridge 118 is rotated out the disc library and located at the positioning point, the disc center DC of the disc storage cartridge 118 needs to be aligned with the disc grabbing center of the disc grabbing device 123 (such as the center column 124). Similarly, the tray center SC of the tray 133 ejected from the disc drive 132 needs to be aligned with the disc grabbing center of the disc grabbing device 123 (such as the center column 124). In other words, in the disc library storage system 100 of the invention, the position correspondence between the disc and the disc grabbing device 123 can be determined according to the position correspondences among the disc library 110, the disc transport device 120 and the disc drive tower 130.

To adjust the positions correspondence between the disc library 110, the disc transport device 120 and the disc drive tower 130, in an embodiment as indicated in FIG. 3B, the disc transport device 120 further includes at least one position adjusting mechanism disposed on one side of the bottom of the lifting mechanism 126. The position adjusting mechanism adjusts the position of the entire disc transport device 120 to adjust the position correspondences among the disc transport device 120, the disc library 110 and the disc drive tower 130.

In the present embodiment, two position adjusting mechanisms are disposed on two opposite sides of bottom of the lifting mechanism 126 for adjusting the position of the disc transport device 120. The position adjusting mechanism includes a rotation member 127 and a fixing base 128. One end of the rotation member 127 leans on the bottom of the lifting mechanism 126, and the other end of the rotation member 127 is screwed to the fixing base 128. The rotation member 127 can be a screw bolt. When the rotation member 127 is rotated, the rotation member 127 pushes the bottom of the lifting mechanism 126 and moves the position of the disc transport device 120 to adjust the disc grabbing center of the disc grabbing device 123 (such as the center column 124), such that the disc grabbing center of the disc grabbing device 123 can be aligned with the disc center DC of the disc storage cartridges 118 and the alignment precision of the disc grabbing device 123 can be increased.

Figure 4A:
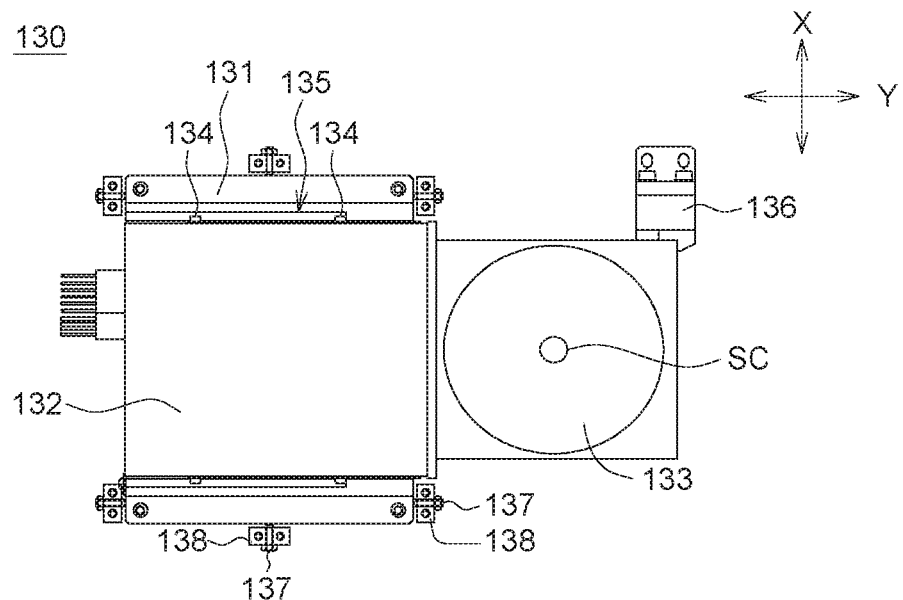
FIGS. 4A-4C respectively are a top view, a side view, and a back view of a disc drive tower according to an embodiment of the invention.
Figure 4B:
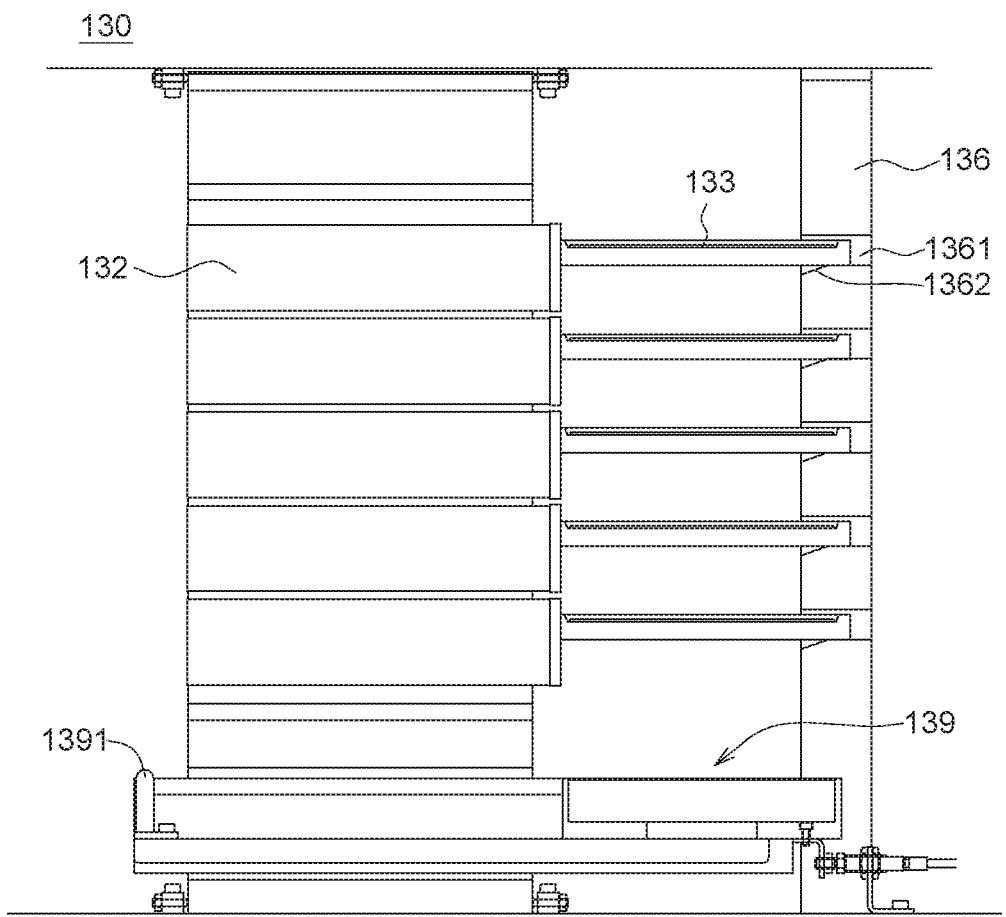
Figure 4C:
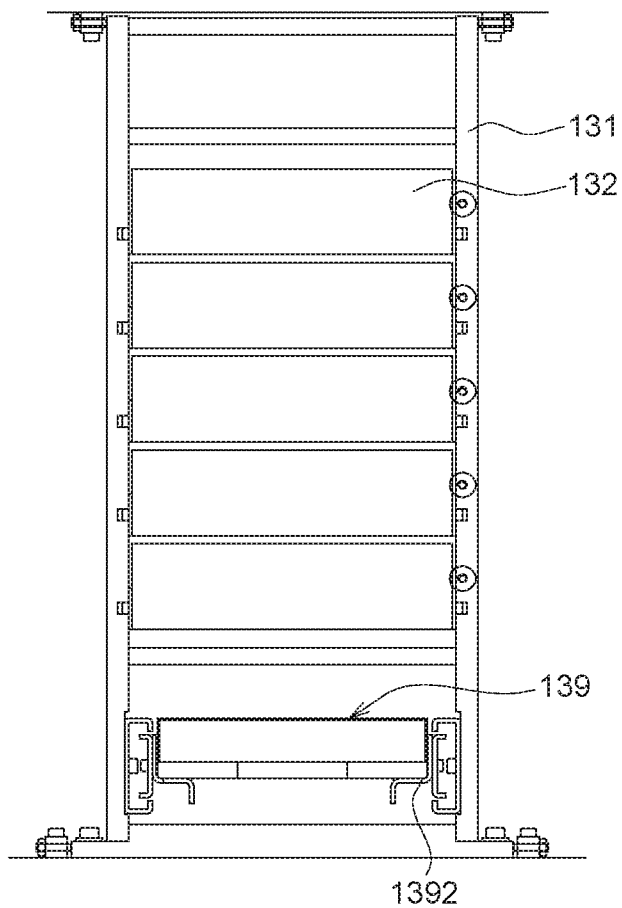

Refer to FIGS. 4A-4C. The disc drive tower 130 includes a casing 131 and multiple disc drives 132 disposed in the casing 131 for reading data from the disc or writing data into the disc. The quantity of the disc drives 132 is basically the same with the quantity of the discs that the disc grabbing device 123 can pick up, such that the disc grabbing device 123 can sequentially unload a predetermined quantity of discs to the corresponding tray 133 of the disc drives 132 with the same quantity. Refer to FIG. 4A and FIG. 4B. According to an embodiment of the invention, the disc library storage system 100 further includes a tray support frame 136 disposed opposite to the disc drive tower 130. The tray support frame 136 includes multiple support recesses 1361 whose positions are parallel to that of the disc drives 132. When a tray 133 of the disc drive 132 is ejected from the disc drive 132, the front end of the tray 133 leans on the corresponding support recess 1361. Thus, when the disc grabbing device 123 moves downwards to pick up discs from the tray 133, the tray 133 will not be damaged by the downward pressing force and will not cause the discs to wobble. Thus, in the present embodiment, the tray support frame 136 supports and protects the tray 133, and the stability of the disc grabbing device 123 when grabbing the disc can be increased.

Refer to FIG. 4B. When the tray 133 is ejected from the disc drive 132, the front end of the tray 133 is slightly lowered due to the gravity. To avoid the front end of the tray 133 colliding with the tray support frame 136, a bevel 1362 is formed under the opening of the support recesses 1361 and used for guiding the front end of the tray 133 to move upwards and enter the support recesses 1361. Thus, the front end of the tray 133 can smoothly enter the support recesses 1361.

Similarly, to adjust the position correspondences among the disc library 110, the disc transport device 120 and the disc drive tower 130, as indicated in FIG. 4A, the disc drive tower 130 further includes at least one position adjusting mechanism disposed on one side of the bottom of the disc drive tower 130. The position adjusting mechanism adjusts the position of the entire disc drive tower 130 to adjust the position correspondences among the disc drive tower 130, the disc library 110 and the disc transport device 120.

In the present embodiment, two position adjusting mechanisms are disposed in the X-axial direction and four position adjusting mechanisms are disposed in the Y-axial direction for adjusting the position of the disc drive tower 130. Each position adjusting mechanism includes a rotation member 137 and a fixing base 138. One end of the rotation member 137 leans on the bottom of the disc drive tower 130, and the other end of the rotation member 137 is screwed to the fixing base 138. The rotation member 137 can be a screw bolt. When the rotation member 137 is rotated, the rotation member 137 pushes the disc drive tower 130 and further moves the position of the disc drive tower 130 to adjust the position of the tray center SC of the tray 133 that has been ejected from the disc drive 132, such that the disc grabbing center of the disc grabbing device 123 (that is, the center column 124) can be aligned with the tray center SC of the tray 133 that has been ejected from the disc drive 132 and the alignment precision of the disc grabbing device 123 can be increased.

Figure 6:
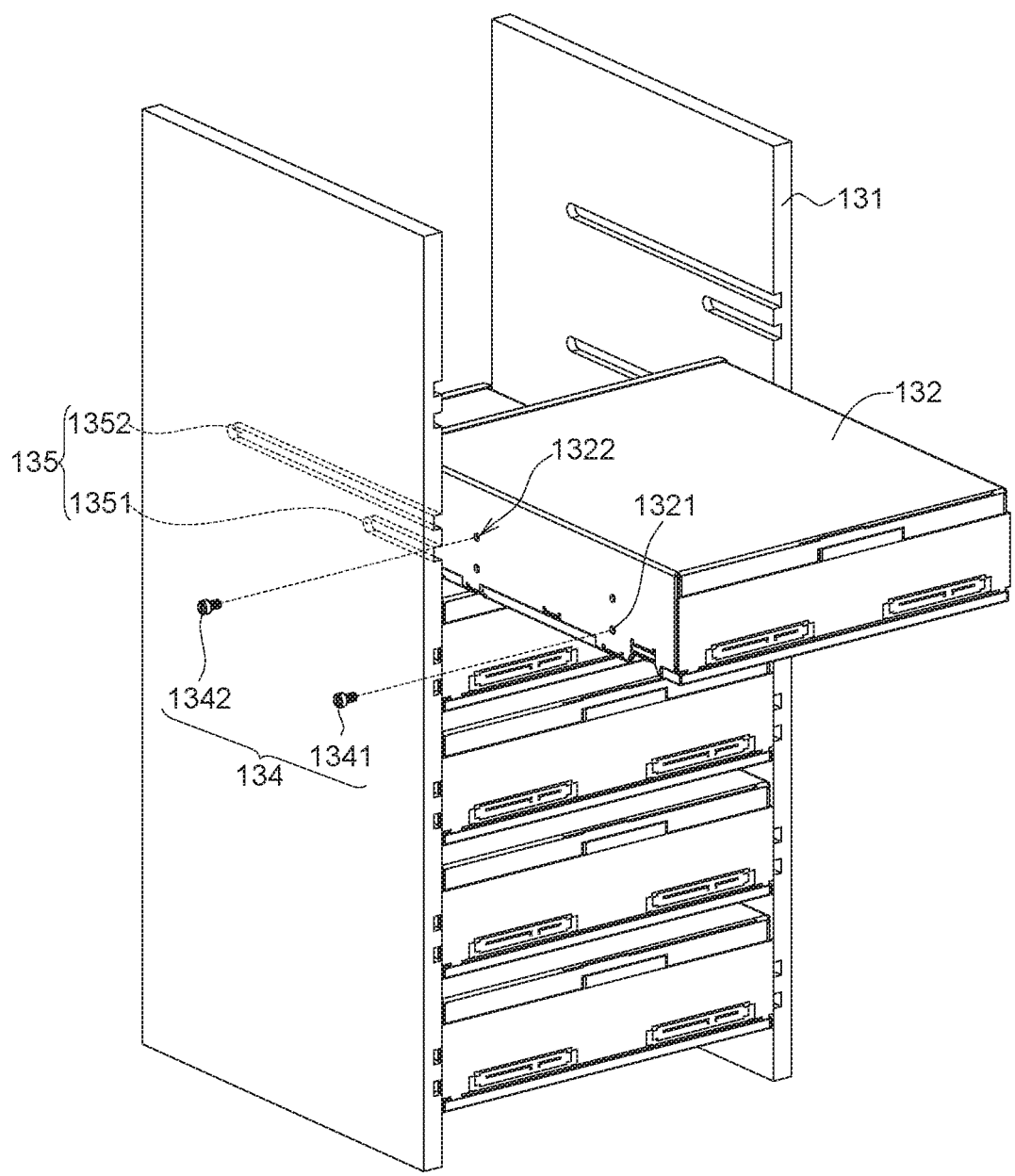
FIG. 6 is a schematic diagram of detachable disc drives installed in a disc drive tower.

FIG. 5 is a top view of a disc supplement cartridge 139 at the bottom of a disc drive tower 130. FIG. 6 is a schematic diagram of detachable disc drives installed in a disc drive tower.

Refer to FIG. 5. In the disc library storage system 100 according to an embodiment of the invention, the disc drive tower 130 further includes a disc supplement cartridge 139 slidably disposed on the bottom of the disc drive tower 130. The disc supplement cartridge 139 can be disposed on a slide rail 1392 and can move along the Y-axial direction. When a certain disc inside the disc library 110 needs to be replaced, the disc grabbing device 123 can pick up the certain disc and unload it in the disc supplement cartridge 139 for the user to replace or supplement the disc. The user can pull the handle 1391 to draw the disc supplement cartridge 139 out the disc drive tower 130, pick up the certain disc from the disc supplement cartridge 139 and then load a new disc to the disc supplement cartridge 139. Then, the user pushes the disc supplement cartridge 139 into the disc drive tower 130, and the disc grabbing device 123 can pick up the new disc from the disc supplement cartridge 139. In the present embodiment, the disc supplement cartridge 139 increases the efficiency of disc replacement or supplement, such that the system can maintain a high efficiency.

Refer to FIG. 6. The disc drive tower 130 uses multiple positioning slots 135 and multiple positioning rods 134 to position relative position between each disc drive 132 and the casing 131. The positioning slots 135 can be disposed on two opposite sides of the casing 131, and are integrally formed in one piece with the casing 131. Each side of the casing 131 includes a first positioning slot 1351 and a second positioning slot 1352. The positioning rods 134 can be disposed on two opposite sides of the disc drive 132. Each side of the disc drive 132 includes a first positioning rod 1341 and a second positioning rod 1342, respectively corresponding to the first positioning slot 1351 and the second positioning slot 1352. The positioning rods 134 can be received in the corresponding positioning slots 135 and can move along the corresponding positioning slots 135, such that the disc drive 132 can move to a predetermined position. In the present embodiment, the first positioning slot 1351 and the second positioning slot 1352 are disposed at different horizontal planes on one side of the casing 131; the first positioning rod 1341 and the second positioning rod 1342 are disposed at different horizontal planes and different vertical planes on one side of the disc drive 132.

In the present embodiment, the positioning rods 134 can be four or more than four head-raised screws (only two are illustrated in the diagram). The positioning rods 134 are screwed to two first screw holes 1321 and two second screw holes 1322 respectively located on two opposite sides of each disc drive 132. That is, each side of the disc drive 132 includes a first screw hole 1321 and a second screw hole 1322. The horizontal level of the first screw hole 1321 is lower than that of the second screw hole 1322, and the first screw hole 1321 is closer to the back side of the disc drive 132 than the second screw hole 1322. In the embodiment, the tray 133 of the disc drive 132 is ejected from the front side of the disc drive 132.

As indicated in FIG. 6, the length of the first positioning slot 1351 is shorter than that of the second positioning slot 1352, and the dead ends of the first positioning slot 1351 and the second positioning slot 1352 can be used as positioning points. When the positioning rods 134 are respectively moved to the dead ends of the corresponding positioning slots 135, the disc drive 132 reaches the positioning points and cannot further move. For example, when the first positioning rod 1341 and the second positioning rod 1342 are respectively moved to the dead ends of the first positioning slot 1351 and the second positioning slot 1352, the corresponding disc drive 132 reaches the positioning point. Meanwhile, each disc drive 132 can be supported by the first positioning rod 1341 and the second positioning rod 1342, respectively located at the front end and the back end, to be firmly located on the casing 131. As disclosed above, through the cooperation of the positioning rods 134 and the positioning slots, the disc drives 132 can be quickly positioned without performing positioning adjustment. Thus, the disc drives 132 can be quickly and conveniently replaced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc library storage system, comprising:
a disc library for placing a plurality of discs, the disc library comprises a plurality of storage cartridge assemblies each comprising a fixing column and a plurality of disc storage cartridges each having a pipe sleeve for mounting on the fixing column, wherein the pipe sleeve has an opening to form two interference arms respectively formed on the two sides of the opening and matching with the fixing column through interference fit;
a disc drive tower, comprising a plurality of disc drives for reading/writing data; and
a disc transport device for moving the discs to the disc drive tower from the disc library and moving the discs to the disc library from the disc drive tower.

2. The disc library storage system according to claim 1, wherein the disc library comprises an upper cover, a lower cover, and the plurality of storage cartridge assemblies detachably disposed between the upper cover and the lower cover.

3. The disc library storage system according to claim 2, wherein each of the storage cartridge assemblies comprises the fixing column and a plurality of disc storage cartridges rotatably disposed on the fixing column, and two ends of the fixing column are detachably disposed on the upper cover and the lower cover respectively through a corresponding fixing piece.

4. The disc library storage system according to claim 1, wherein the disc library comprises the plurality of disc storage cartridges, the disc transport device comprises a disc grabbing device and a lifting mechanism driving the disc grabbing device to vertically move to a vertical position of a corresponding disc storage cartridge; the disc grabbing device comprises a push lever; when the disc library rotates along a first direction, the push lever pushes the corresponding disc storage cartridge out the disc library.

5. The disc library storage system according to claim 4, wherein a tip of the push lever has a roller; each of the disc storage cartridges has an outer flange; when the disc library rotates along the first direction and the push lever pushed the corresponding disc storage cartridge out the disc library, the push lever contacts the outer flange through the roller.

6. The disc library storage system according to claim 1, wherein the disc library comprises the plurality of disc storage cartridges, the disc transport device comprises an optical positioning device for positioning a position at which the disc storage cartridge is pushed out the disc library; the optical positioning device emits a light spot for detecting a position of an edge contour of the disc storage cartridge to determine whether the disc storage cartridge has reached a positioning point.

7. The disc library storage system according to claim 1, wherein the disc transport device further comprises at least one position adjusting mechanism for adjusting a position of the disc transport device to adjust the position correspondences among the disc transport device, the disc library and the disc drive tower.

8. The disc library storage system according to claim 1, wherein the disc drive tower further comprises at least one position adjusting mechanism for adjusting a position of the disc drive tower to adjust the position correspondences among the disc drive tower, the disc library and the disc transport device.

9. The disc library storage system according to claim 1, further comprising a tray support frame disposed opposite to the disc drive tower, wherein the tray support frame comprises a plurality of support recesses respectively disposed corresponding to positions of trays of the disc drives; when the tray of the disc drive is ejected from the disc drive, a front end of the tray leans on a corresponding support recess.

10. The disc library storage system according to claim 1, wherein the disc drive tower comprises a disc supplement cartridge slidably disposed on a bottom of the disc drive tower.

11. The disc library storage system according to claim 1, wherein the disc drive tower comprises a casing; each of the disc drives is positioned on the casing through a first positioning slot, a second positioning slot, a first positioning rod and a second positioning rod; the first positioning slot and the second positioning slot are disposed at different horizontal planes on one side of the casing; a length of the first positioning slot is different from a length of the second positioning slot; the first positioning rod and the second positioning rod are disposed at different horizontal planes and different vertical planes on one side of the disc drive; the first positioning rod and the second positioning rod are correspondingly disposed in the first positioning slot and the second positioning slot, respectively.

12. The disc library storage system according to claim 1, wherein the interference arm matches with the fixing column through interference fit both when the disc storage cartridge is inside the disc library and when the disc storage cartridge is located at a positioning point out of the disc library.

13. The disc library storage system according to claim 1, wherein before the disc storage cartridge is mounted on the fixing column, an inner side of the interference arm partly overlaps the fixing column.

14. The disc library storage system according to claim 1, wherein when the disc storage cartridge is mounted on the fixing column, the interference arm is pushed outwards by the fixing column to press against and apply an elastic force to the fixing column.

15. The disc library storage system according to claim 1, wherein the disc transport device comprises an optical positioning device for positioning a position at which the disc storage cartridge rotates out of the disc library.

16. The disc library storage system according to claim 14, wherein the optical positioning device emits a light spot for detecting a position of an edge contour of the disc storage cartridge to determine whether the disc storage cartridge has reached a positioning point.

17. The disc library storage system according to claim 1, wherein the disc library further comprises an upper cover and a lower cover, and two ends of the fixing column are detachably disposed on the upper cover and the lower cover respectively.

* * * * *